US012807313B2

(12) United States Patent
Boudreau et al.

(10) Patent No.: US 12,807,313 B2
(45) Date of Patent: Nov. 24, 2026

(54) AIRCRAFT CABIN STORAGE CONSOLES

(71) Applicant: Textron Innovations Inc., Providence, RI (US)

(72) Inventors: Cameron Boudreau, Farmers Branch, TX (US); Andrew James Zahasky, North Richland Hills, TX (US); Chirag Patel, Flower Mound, TX (US); Craig D. Cillessen, Dallas, TX (US); Jonathan Andres, Mansfield, TX (US)

(73) Assignee: Textron Inc., Providence, RI (US)

(*) Notice: Subject to any disclaimer, the term of this patent is extended or adjusted under 35 U.S.C. 154(b) by 318 days.

(21) Appl. No.: 18/882,592

(22) Filed: Sep. 11, 2024

(65) Prior Publication Data

US 2026/0070656 A1 Mar. 12, 2026

(51) Int. Cl.
*B64D 11/00* (2006.01)

(52) U.S. Cl.
CPC .................................... *B64D 11/00* (2013.01)

(58) Field of Classification Search
CPC .......... B60N 3/10; B60N 3/101; B60N 3/102; B60N 2/793; B60H 1/0055; B60H 1/00592; B60P 3/32; B60Q 3/229; B60Q 3/233; B60R 7/00; B60R 7/04; B60R 7/06; B60R 11/02; E05B 83/32; A47B 31/00; A47B 2031/00; H02J 50/005; H02J 50/10; H02J 50/12; H02J 7/02; H02J 7/73
See application file for complete search history.

(56) References Cited

U.S. PATENT DOCUMENTS

| | | | | |
|---|---|---|---|---|
| 7,513,007 B2 * | 4/2009 | Chernoff | A47L 5/24 | 62/331 |
| 12,134,369 B2 * | 11/2024 | Kim | B60R 7/04 | |
| 2007/0194582 A1 * | 8/2007 | Arbaugh | B60R 7/04 | 296/37.8 |
| 2009/0058120 A1 * | 3/2009 | Ioka | B60R 7/04 | 296/24.35 |
| 2010/0090487 A1 * | 4/2010 | Carnevali | B60N 3/12 | 296/24.34 |
| 2013/0008930 A1 * | 1/2013 | Hipshier | B60R 7/04 | 224/275 |
| 2020/0406823 A1 * | 12/2020 | An | B60N 2/773 | |
| 2021/0320528 A1 * | 10/2021 | Kim | B60N 3/10 | |

* cited by examiner

*Primary Examiner* — Joshua J Michener
*Assistant Examiner* — Cindi M Curry
(74) *Attorney, Agent, or Firm* — Lawrence Youst PLLC

(57) ABSTRACT

An aircraft cabin storage console positionable between passenger seats of an aircraft. The aircraft cabin storage console includes a frame having first and second sidewalls and an aft wall. An upper storage section forms an upper surface and includes first and second cup holders. An intermediate drawer is slidably coupled to the frame. The intermediate drawer forms an intermediate concealable storage compartment and includes third and fourth concealable cup holders. A lower drawer is slidably coupled to the frame. The lower drawer forms a lower concealable storage compartment. A two-stage opening mechanism is configured to selectively secure the intermediate drawer in a partially open position to provide access to the third and fourth concealable cup holders and is configured to selectively allow the intermediate drawer to be shifted between the partially open position and a fully open position to provide access to the intermediate concealable storage compartment.

20 Claims, 13 Drawing Sheets

AIRCRAFT CABIN STORAGE CONSOLES

TECHNICAL FIELD OF THE DISCLOSURE

The present disclosure relates, in general, to storage systems for use in aircraft cabins and, in particular, to an aircraft cabin storage console that is positionable between passenger seats and includes a two-stage opening mechanism configured to secure an intermediate drawer in a partially open position to selectively provide access to concealable cup holders.

BACKGROUND

Navigating urban roadways can be a time consuming and frustrating experience due to vehicular traffic, which is rapidly worsening. Air travel provides an alternative transportation option that avoids such ground-level congestion. Rotorcraft, such as helicopters, are particularly well-suited for urban transportation as takeoffs and landings are runway independent. Helicopters can enable travel almost anywhere within a metropolitan area in a matter of minutes, thereby enhancing efficiency and productivity. For example, the reduced travel times provided by helicopters may enable passengers to attend multiple meetings or visits multiple sites in a single day. In addition, helicopters can access remote or hard-to-reach locations and transport passengers directly to their destination, minimizing the need for additional ground transportation. Further, helicopters can provide a private space for conducting business, ensuring that confidential conversations remain secure and uninterrupted. By alleviating the anxiety and frustration associated with navigating congested city streets, helicopters can provide a more relaxed and enjoyable commute. As an added benefit, modern helicopters are equipped with systems that reduce noise pollution and fuel consumption, resulting in a lower environmental impact compared to other modes of transportation. It has been found, however, that helicopter cabins typically lack suitable storage spaces for many of the personal belongings that passengers would like to carry on, such as mobile phones, tablets, laptop computers, purses, briefcases, food and beverages. Accordingly, a need has arisen for improved helicopter cabins that provide purposefully-sized storage areas for the most common types of transported items.

SUMMARY

In a first aspect, the present disclosure is directed to an aircraft cabin storage console that is positionable between passenger seats of an aircraft. The aircraft cabin storage console includes a frame having first and second sidewalls and an aft wall. An upper storage section forms an upper surface. The upper storage section is fixably coupled to the frame and includes first and second cup holders. An intermediate drawer is slidably coupled to the frame. The intermediate drawer forms an intermediate concealable storage compartment and includes third and fourth concealable cup holders. The intermediate drawer has a closed position, a partially open position and a fully open position relative to the frame. A lower drawer is slidably coupled to the frame. The lower drawer forms a lower concealable storage compartment. A two-stage opening mechanism is configured to selectively secure the intermediate drawer in the partially open position to provide access to the third and fourth concealable cup holders and is configured to selectively allow the intermediate drawer to be shifted between the partially open position and the fully open position to provide access to the intermediate concealable storage compartment.

In some embodiments, the upper storage section may form an upper concealable storage compartment and may have a hingable lid with open and closed positions to selectively provide access to the upper concealable storage compartment. In certain embodiments, the upper concealable storage compartment may include one or more charging ports. In some embodiments, in the closed position, the hingable lid may form a gap with the upper surface that is configured to pass one or more charging cords therethrough. In certain embodiments, the first and second cup holders may include angled slots configured to hold one or more electronic devices at a viewing angle. In some embodiments, the third and fourth concealable cup holders may be forward of the intermediate concealable storage compartment of the intermediate drawer. In certain embodiments, an intermediate telescoping slide mechanism may slidably couple the intermediate drawer to the frame.

In some embodiments, the two-stage opening mechanism may include a detent mechanism and a detent receiver positioned between the intermediate drawer and the frame. In such embodiments, the detent mechanism may be coupled to the frame and the detent receiver may be coupled to the intermediate drawer. Also, in such embodiments, the detent receiver may be coupled to the intermediate drawer aft of the third and fourth concealable cup holders and/or the detent receiver may be coupled to the intermediate drawer above the intermediate telescoping slide mechanism. In certain embodiments, the two-stage opening mechanism may include first and second oppositely disposed detent mechanisms and first and second oppositely disposed detent receivers positioned between the intermediate drawer and the frame. In such embodiments, the detent mechanisms may be coupled to the frame and the detent receivers may be coupled to the intermediate drawer. Also, in such embodiments, the detent receivers may be coupled to the intermediate drawer aft of the third and fourth concealable cup holders and/or the detent receivers may be coupled to the intermediate drawer above the intermediate telescoping slide mechanism. In some embodiments, a lower telescoping slide mechanism may slidably couple the lower drawer to the frame. In certain embodiments, a removeable ice bin may be positionable in the lower concealable storage compartment.

In a second aspect, the present disclosure is directed to an aircraft cabin that includes first and second passenger seats. An aircraft cabin storage console is positioned between the first and second passenger seats. The aircraft cabin storage console includes a frame having first and second sidewalls and an aft wall. An upper storage section forms an upper surface. The upper storage section is fixably coupled to the frame and includes first and second cup holders. An intermediate drawer is slidably coupled to the frame. The intermediate drawer forms an intermediate concealable storage compartment and includes third and fourth concealable cup holders. The intermediate drawer has a closed position, a partially open position and a fully open position relative to the frame. A lower drawer is slidably coupled to the frame. The lower drawer forms a lower concealable storage compartment. A two-stage opening mechanism is configured to selectively secure the intermediate drawer in the partially open position to provide access to the third and fourth concealable cup holders and is configured to selectively allow the intermediate drawer to be shifted between the partially open position and the fully open position to provide access to the intermediate concealable storage compartment.

In a third aspect, the present disclosure is directed to an aircraft that includes a fuselage. An aircraft cabin is positioned within the fuselage. First and second passenger seats are positioned within the aircraft cabin. An aircraft cabin storage console is positioned between the first and second passenger seats. The aircraft cabin storage console includes a frame having first and second sidewalls and an aft wall. An upper storage section forms an upper surface. The upper storage section is fixably coupled to the frame and includes first and second cup holders. An intermediate drawer is slidably coupled to the frame. The intermediate drawer forms an intermediate concealable storage compartment and includes third and fourth concealable cup holders. The intermediate drawer has a closed position, a partially open position and a fully open position relative to the frame. A lower drawer is slidably coupled to the frame. The lower drawer forms a lower concealable storage compartment. A two-stage opening mechanism is configured to selectively secure the intermediate drawer in the partially open position to provide access to the third and fourth concealable cup holders and is configured to selectively allow the intermediate drawer to be shifted between the partially open position and the fully open position to provide access to the intermediate concealable storage compartment. In some embodiments, the aircraft may be a rotorcraft such as a helicopter.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
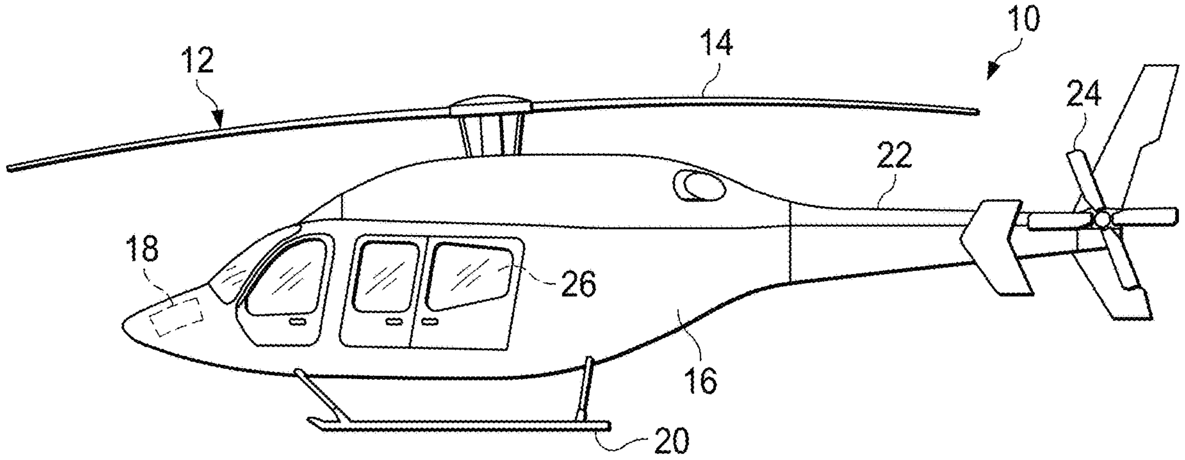
FIGS. 1A-1B are schematic illustrations of a rotorcraft having one or more aircraft cabin storage consoles in the aircraft cabin in accordance with embodiments of the present disclosure.
Figure 1B:
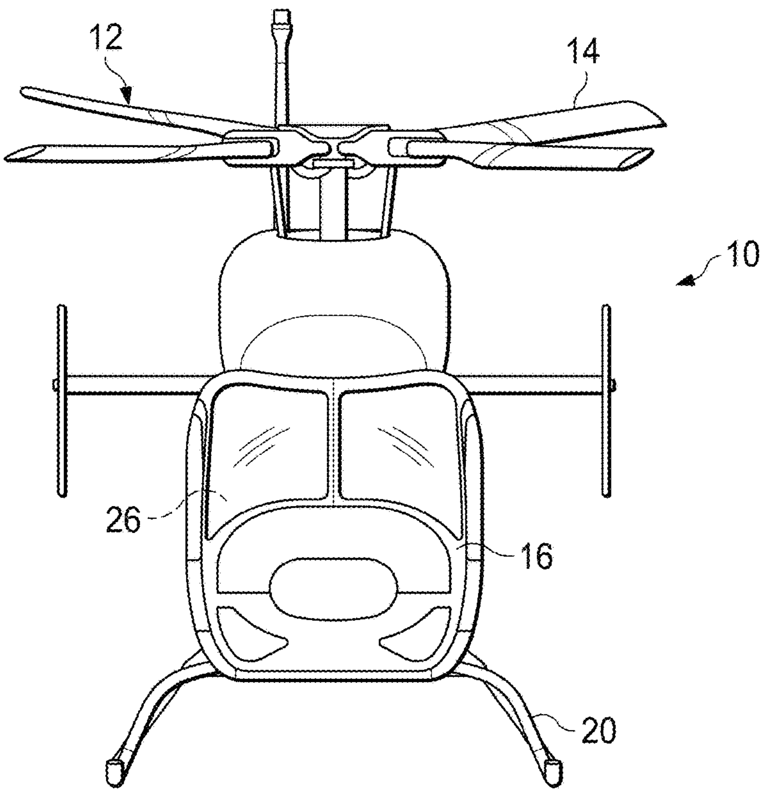

Referring to FIGS. 1A-1B in the drawings, an aircraft depicted as a rotorcraft and more particularly as a helicopter is schematically illustrated and generally designated 10. Helicopter 10 includes a rotor system 12 having a plurality of rotor blade assemblies 14. Rotor system 12 is rotatable relative to a fuselage 16 of helicopter 10. Various operations of rotorcraft 10 including primary flight operations are controlled and managed by a flight control computer 18. The pitch of rotor blade assemblies 14 can be collectively and/or cyclically manipulated to selectively control direction, thrust and lift of helicopter 10. A landing gear system 20 provides ground support for helicopter 10. A tailboom 22 extends aftwardly from fuselage 16. A tail rotor system 24 is rotatably coupled to the aft portion of tailboom 22. The main interior space of helicopter 10 is an aircraft cabin 26 that includes seating for one or more pilots and a plurality of passengers. The pilots operate helicopter 10 from the cockpit which forms the forward portion of cabin 26 and includes, for example, one or more collective levers, one or more cyclic sticks and one or more sets of foot pedals as well as various other instruments, displays and controls. Aircraft cabin 26 includes a plurality of windows that provide visibility for the pilots and passengers. Aircraft cabin 26 may be equipped with heating and cooling systems to maintain a comfortable temperature for the occupants. In the illustrated embodiment, aircraft cabin 26 includes one or more storage systems that provide safe and secure spaces for personal items, luggage and equipment. For example, one or more aircraft cabin storage consoles may be positioned between passenger seats within aircraft cabin 26 and may have purposefully-sized storage areas for the most common types of items transported by passengers such as mobile phones, tablets, laptop computers, purses, briefcases, food and beverages.

It should be appreciated that helicopter 10 is merely illustrative of a variety of aircraft that can implement the embodiments disclosed herein. Indeed, the storage systems of the illustrative embodiments may be implemented on any aircraft. Other aircraft implementations can include fixed wing aircraft, hybrid aircraft, tiltwing aircraft, tiltrotor aircraft, compound helicopters, jets and the like. As such, those skilled in the art will recognize that the storage systems of the illustrative embodiments can be integrated into a variety of aircraft configurations. It should be appreciated that even though aircraft are particularly well-suited to implement the embodiments of the present disclosure, non-aircraft vehicles can also implement the embodiments.

Figure 2:
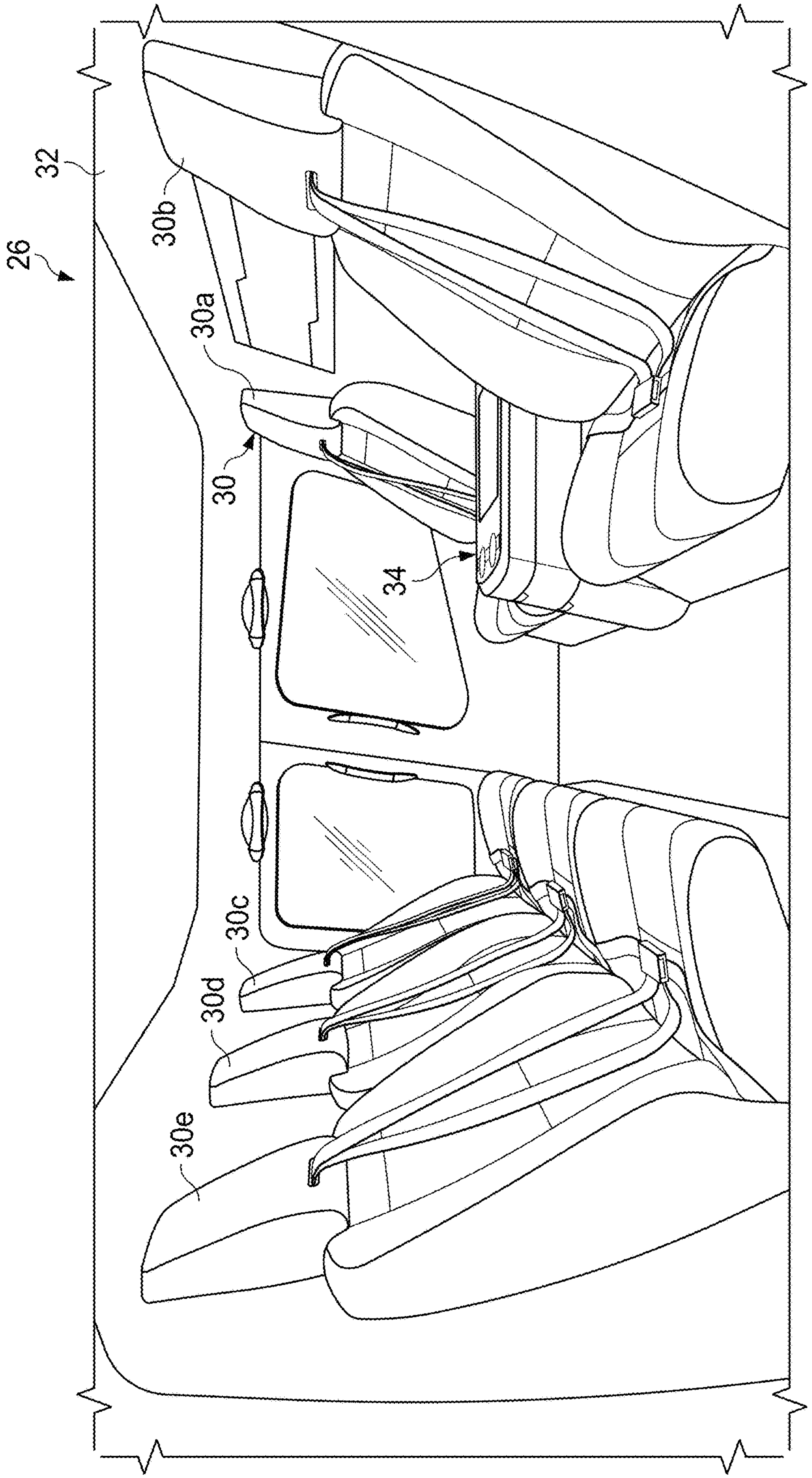
FIG. 2 is a side view of an aircraft cabin including an aircraft cabin storage console positioned between two forward-facing passenger seats in accordance with embodiments of the present disclosure.

Referring now to FIG. 2 of the drawings, a passenger area of aircraft cabin 26 of helicopter 10 is depicted. It should be understood by those having ordinary skill in the art that an aircraft cabin such as aircraft cabin 26 would also include the cockpit positioned forward of the passenger area as well as a cargo area positioned aft of the passenger area. In the illustrated embodiment, a row of forward-facing passenger seats 30*a*, 30*b* are positioned in front of a bulkhead 32 with a row of aft-facing passenger seats 30*c*, 30*d*, 30*e* positioned forward thereof and behind the cockpit seats. Passenger seats 30*a*, 30*b*, 30*c*, 30*d*, 30*e* may collectively be referred to as passenger seats 30. Passenger seats 30 preferably provide a high level of protection for passengers in the event of an emergency and are designed to withstand the forces of a crash to protect the passengers from injury. For example, passenger seats 30 may be constructed with energy-absorbing materials that can help reduce the impact of a crash on the passengers. In addition, passenger seats 30 include harnesses or restraint system that secures the passengers in place to help prevent them from being ejected from passenger seats 30 and also include headrests that can help prevent whiplash and other neck injuries. Passenger seats 30 may be covered with materials that are chosen for their durability, comfort and safety. For example, passenger seats 30 may be covered with leather, which is comfortable and easy to clean, lightweight fabrics made from nylon or polyester including flame-resistant fabrics that are designed to slow the spread of fire and protect the passengers from burns and/or neoprene, which is resistant to moisture and provides good cushioning.

Figure 3A:
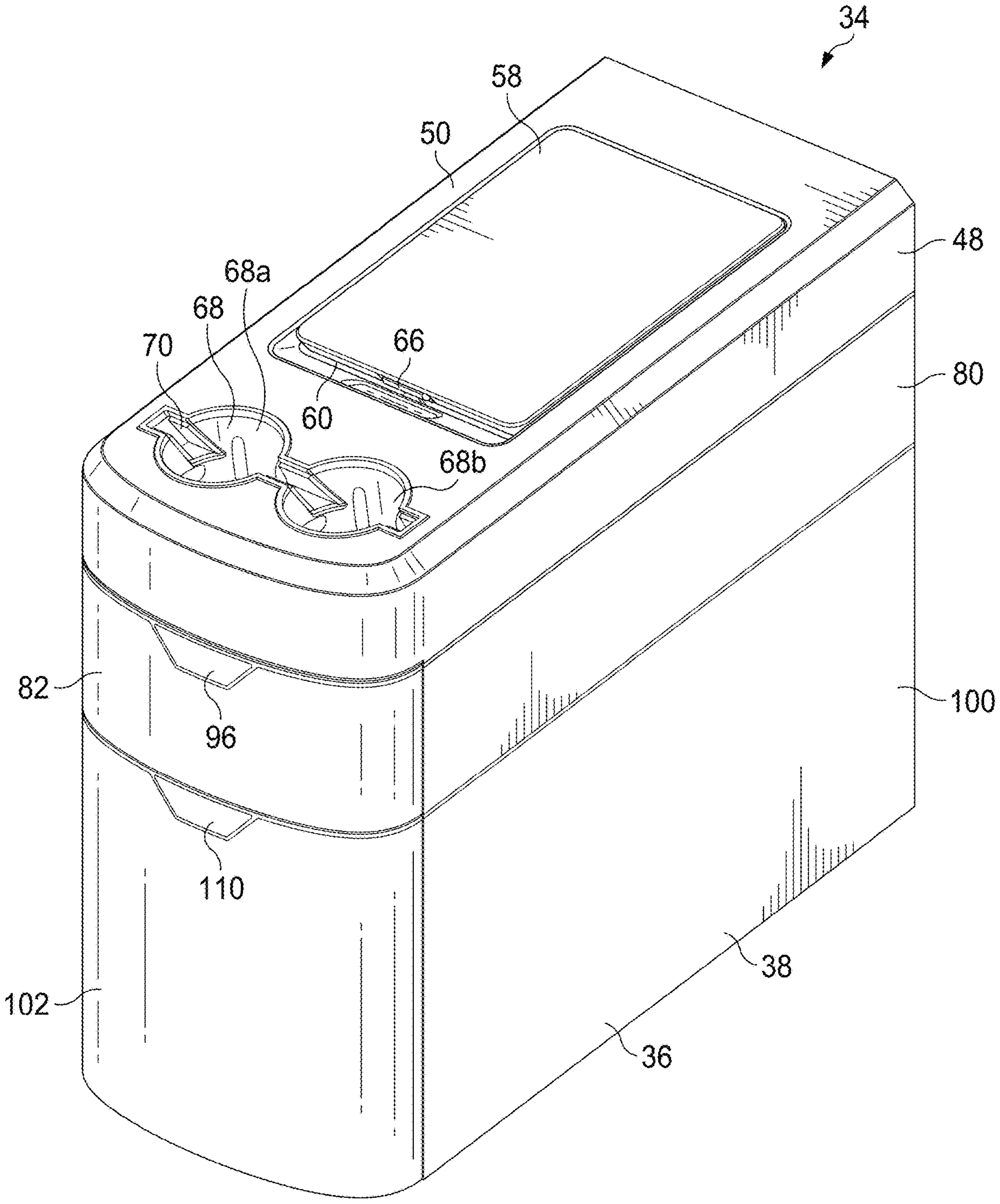
FIGS. 3A-3D are isometric, front, top and side views of an aircraft cabin storage console in accordance with embodiments of the present disclosure.
Figure 3B:
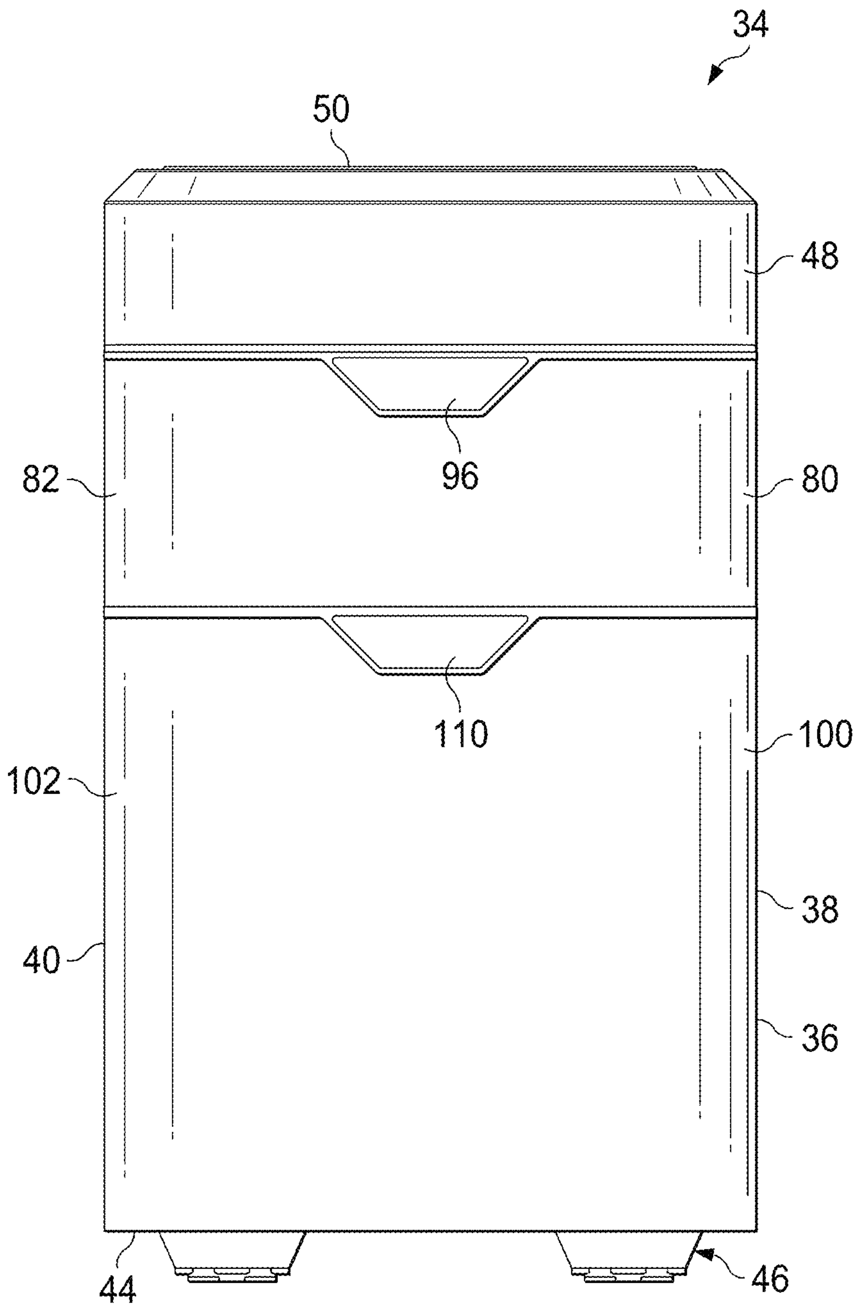
Figure 3C:
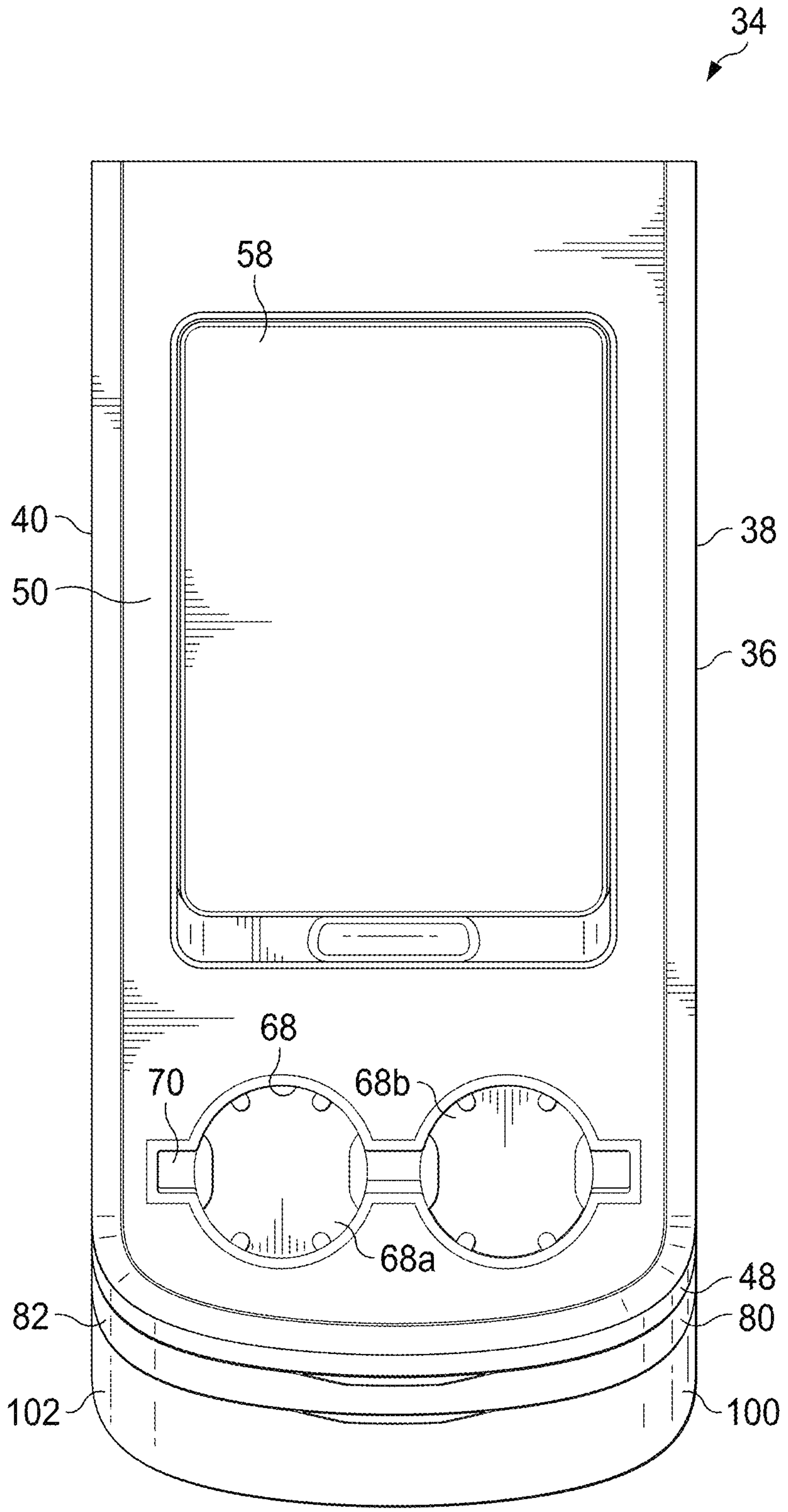
Figure 3D:
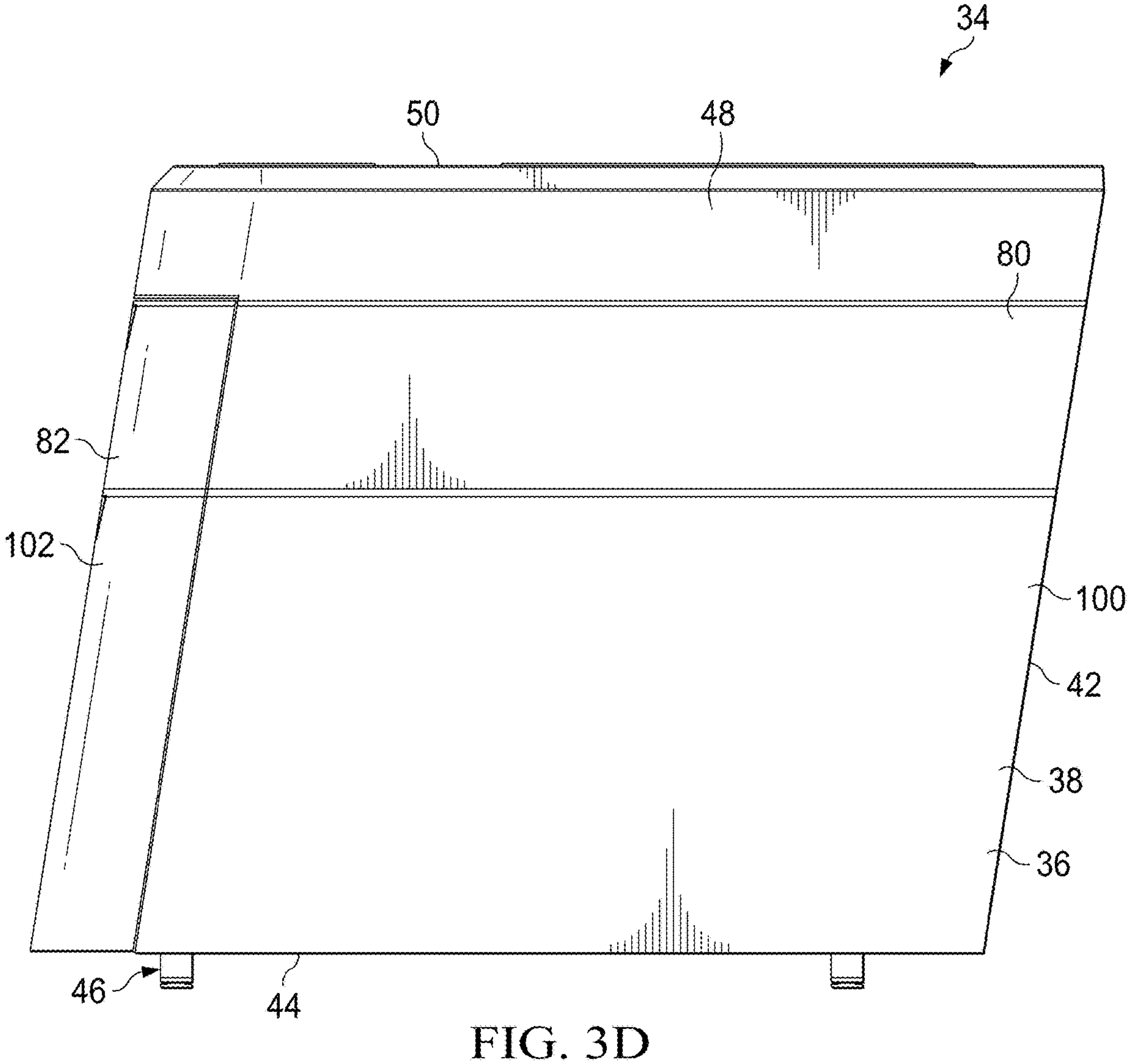

In the illustrated embodiment, an aircraft cabin storage console 34 is positioned between passenger seats 30*a*, 30*b*. As discussed herein, aircraft cabin storage console 34 has a plurality of purposefully-sized storage areas for the most common types of items transported by passengers such as mobile phones, tablets, laptop computers, purses, briefcases, food and beverages. Referring additional to FIGS. 3A-3D of the drawings, aircraft cabin storage console 34 includes a frame 36 having left sidewall 38, a right sidewall 40 and an aft wall 42. Frame 36 may be formed from strong and lightweight materials such as wood, metal, polymer composites or other suitable materials. Frame 36 may have an outer skin that matches passenger seats 30 or other cabin elements and may be formed from wood veneer, leather, polymer or other suitably stylish material. As best seen in FIG. 3D, aft wall 42 is not vertical but instead has an angled profile that generally matches the tilt angle of bulkhead 32, which helps to maximize the storage capabilities of aircraft cabin storage console 34. Aircraft cabin storage console 34 has a base 44 that is coupled to frame 36 using screws, glue, hidden joints or other suitable fastening means. Base 44 forms the bottom surface of aircraft cabin storage console 34. A plurality of supports 46 are coupled to the bottom surface of base 44, such as two forward supports and two aft supports, which enable aircraft cabin storage console 34 to be secured to the floor of aircraft cabin 26. In other embodiments, aft wall 42 could additionally or alternatively be secured to bulkhead 32.

Figure 4B:
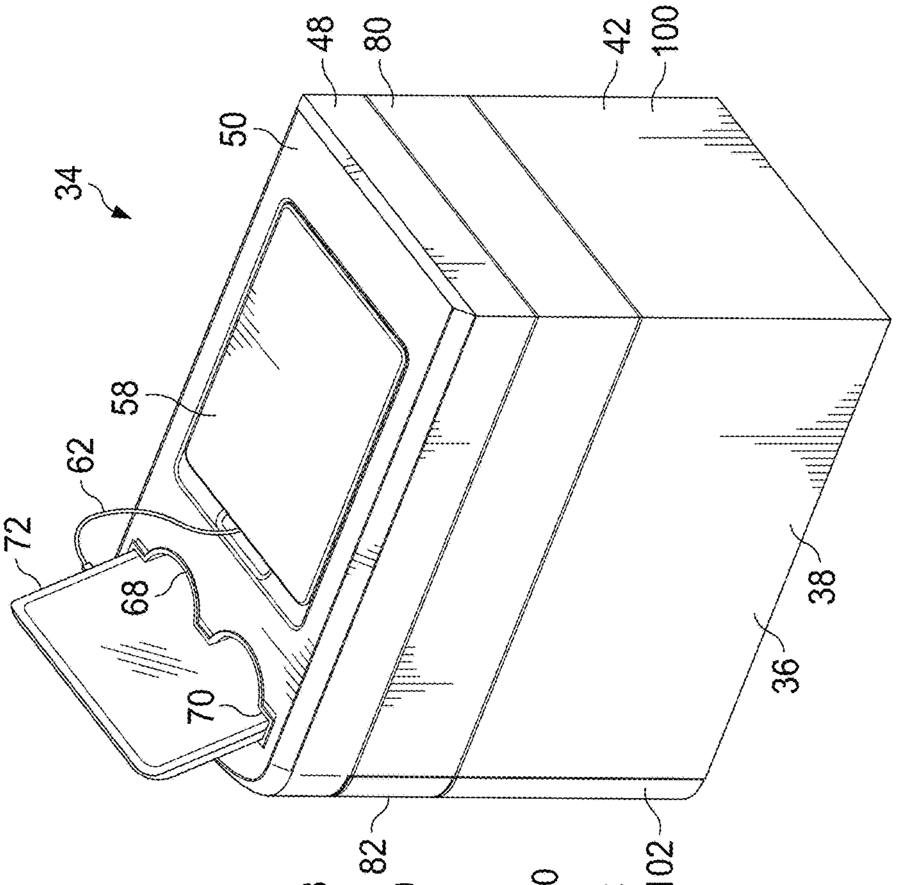
FIGS. 4A-4B are isometric views of an aircraft cabin storage console depicting features of an upper storage section in accordance with embodiments of the present disclosure.
Figure 4A:
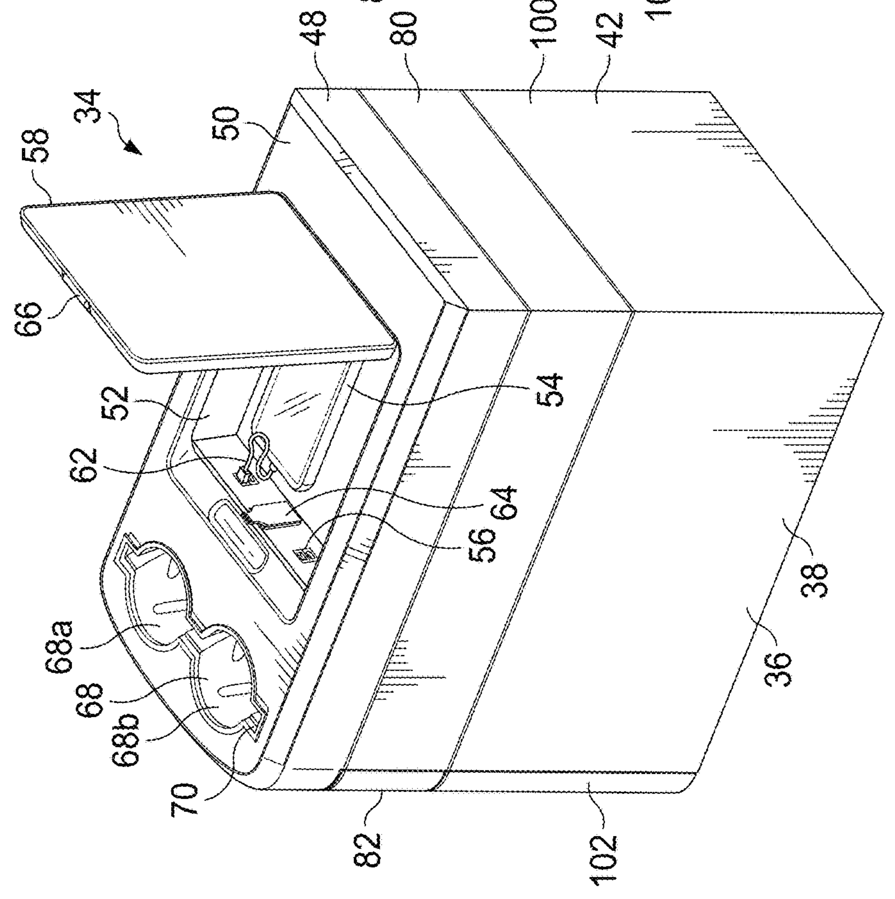

Aircraft cabin storage console 34 has an upper storage section 48 that forms an upper surface 50, which may be used as an armrest for the occupants of passenger seats 30*a*, 30*b*. Upper surface 50 may match the outer skin of frame 36 and may be formed from wood veneer, leather, polymer or other suitably stylish material. Upper storage section 48 is fixably coupled to frame 36. As best seen in FIGS. 4A-4B of the drawings, upper storage section 48 includes an upper concealable storage compartment 52 that is sized to receive small items such as a mobile phone 54, snacks, gloves or other personal articles. Upper concealable storage compartment 52 includes a plurality of charging ports 56 such as universal serial bus (USB) charging port or other types charging ports suitable for the electronic devices commonly transported by passengers. Upper storage section 48 includes a hingable lid 58 that has open and closed positions to selectively provide access to upper concealable storage compartment 52. In the closed position, hingable lid 58 and upper surface 50 form a gap 60 (see FIG. 3A) that is configured to pass one or more charging cords 62 therethrough (see FIG. 4B). Hingable lid 58 is secured in the closed position with a latch assembly 64 that may be released with a push button 66 on hingable lid 58. Upper storage section 48 includes a cupholder assembly 68 that forms right and left cup holders 68*a*, 68*b* that are sized to receive a wide variety of drink containers. In addition, cupholder assembly 68 includes a slot system 70 that is sized to receive multiple mobile phones or a tablet computer 72 therein and is angled to support the received electronic device(s) therein at a suitable viewing angle for the occupants of passenger seats 30*a*, 30*b*.

Aircraft cabin storage console 34 has an intermediate storage section 80 that is positioned below upper storage section 48. Intermediate storage section 80 includes an intermediate drawer 82 that is slidably coupled to frame 36 with an intermediate telescoping slide mechanism 84 including a right telescoping slide 84*a* and a left telescoping slide 84*b*. An outer portion of right telescoping slide 84*a* is coupled to frame 36 and an inner portion of right telescoping slide 84*a* is coupled to intermediate drawer 82. Likewise, an outer portion of left telescoping slide 84*b* is coupled to frame 36 and an inner portion of left telescoping slide 84*b* is coupled to intermediate drawer 82. Intermediate telescoping slide mechanism 84 supports intermediate drawer 82 within frame 36 and provides intermediate drawer 82 with a translation degree of freedom relative to frame 36 as best seen in the opening progression from FIG. 5C to FIG. 5E as well as the closing progression from FIG. 5E to FIG. 5C. Intermediate drawer 82 includes an intermediate concealable storage compartment 86 that is sized to receive a tablet or notebook computer, workbooks, articles of clothing, food or other personal items. Intermediate drawer 82 includes a cupholder assembly 88 that forms right and left concealable cup holders 88*a*, 88*b* that are sized to receive a wide variety of drink containers. Cupholder assembly 88 is forward of intermediate concealable storage compartment 86.

Figure 5A:
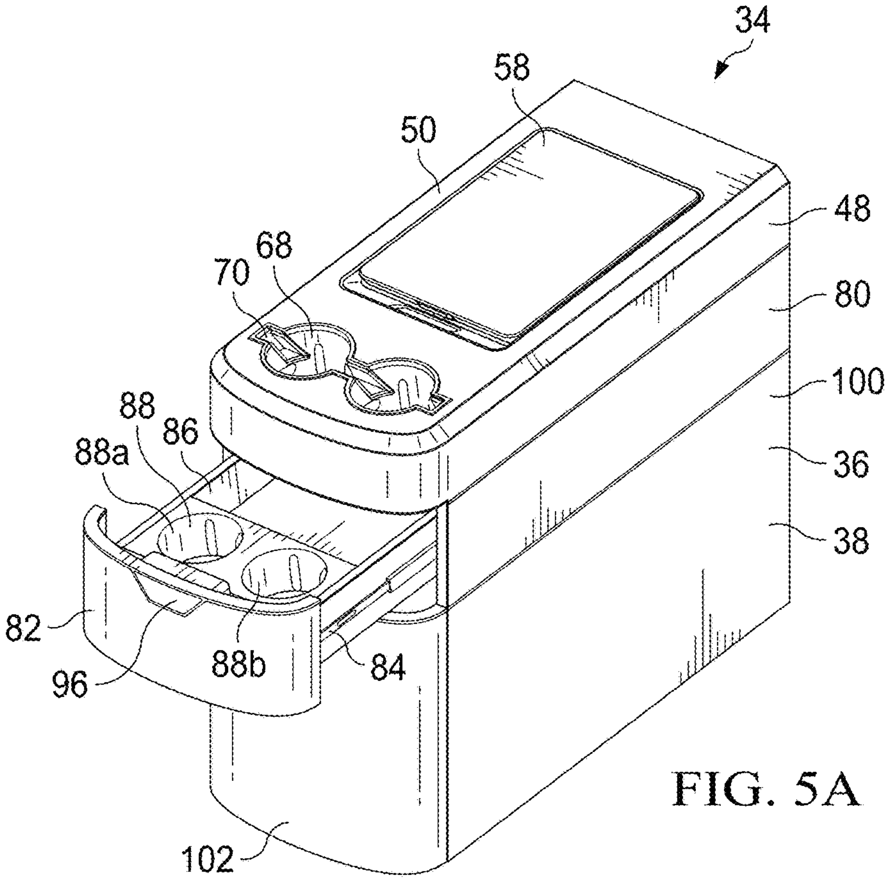
FIGS. 5A-5G are isometric, top, exploded and expanded views of an aircraft cabin storage console depicting features of an intermediate drawer in a plurality of positions in accordance with embodiments of the present disclosure.
Figure 5B:
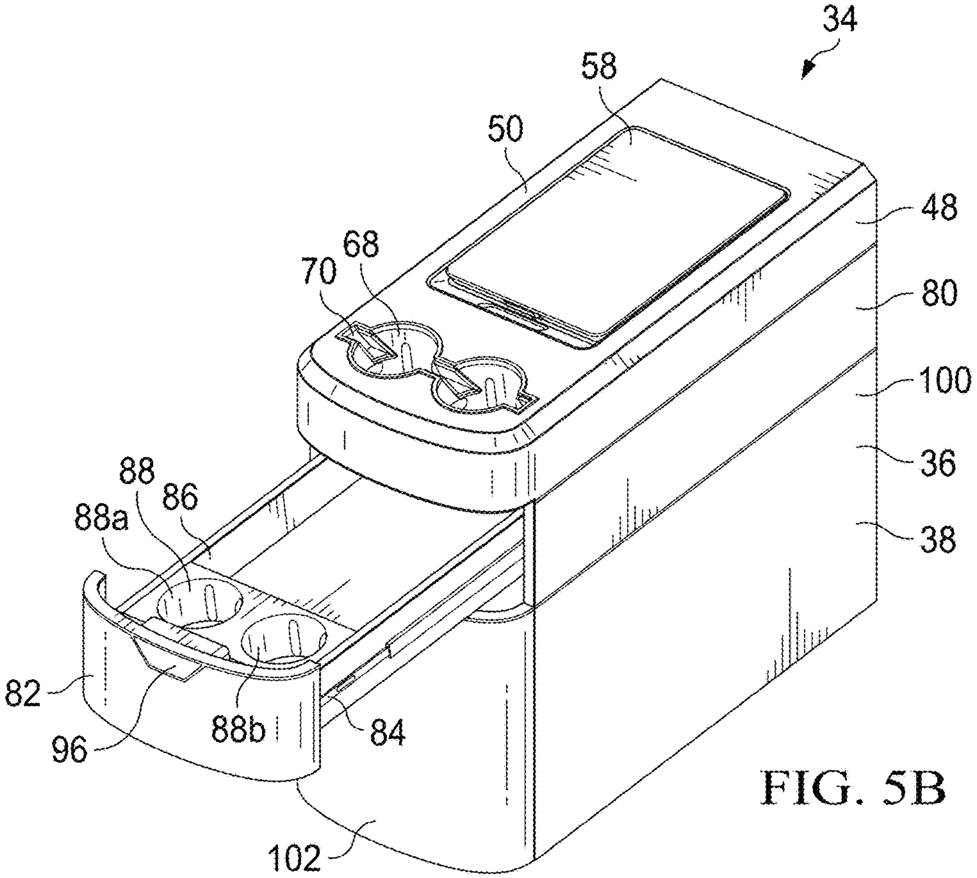
Figure 5C:
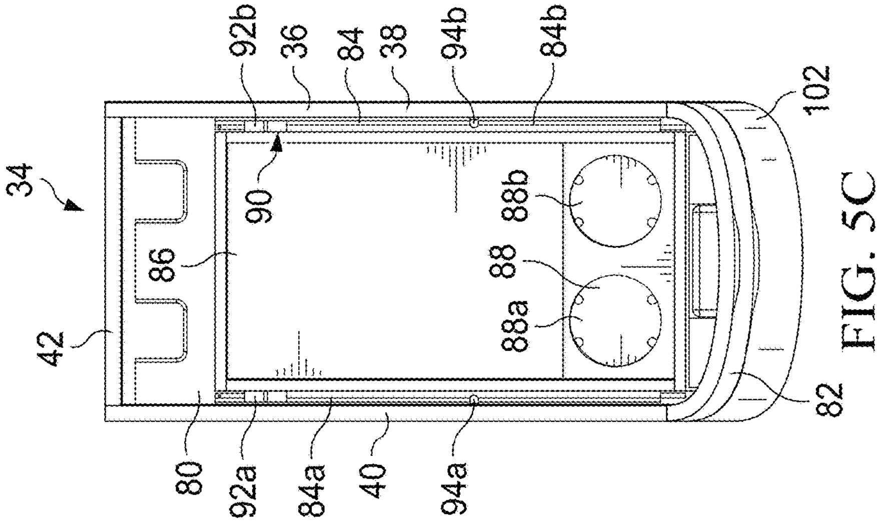
Figure 5D:
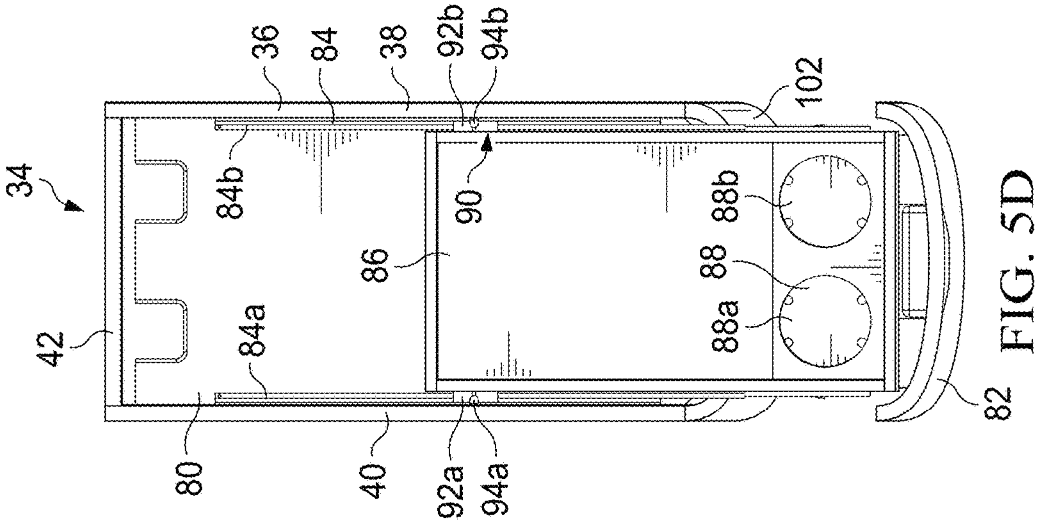
Figure 5E:
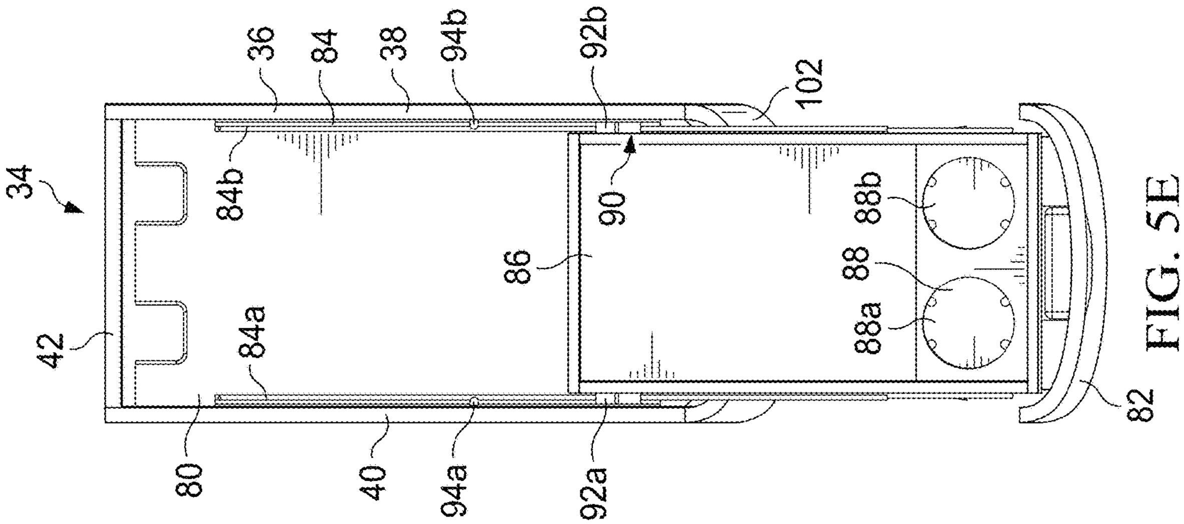
Figure 5F:
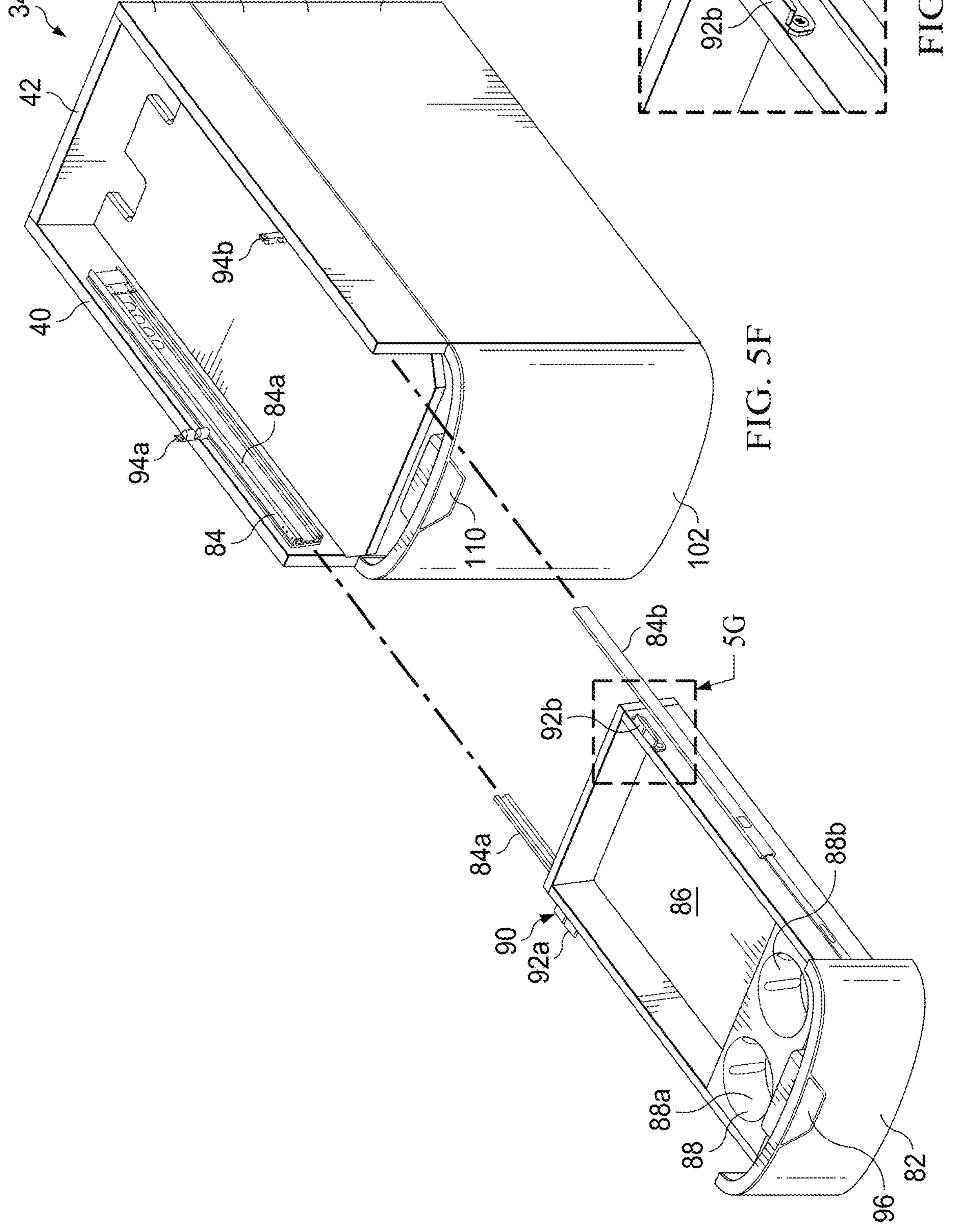
Figure 5G:
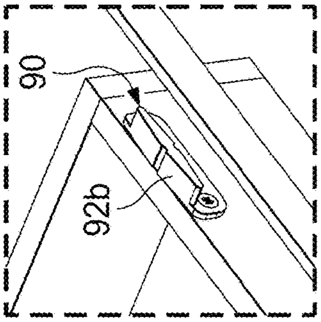
Figure 6:
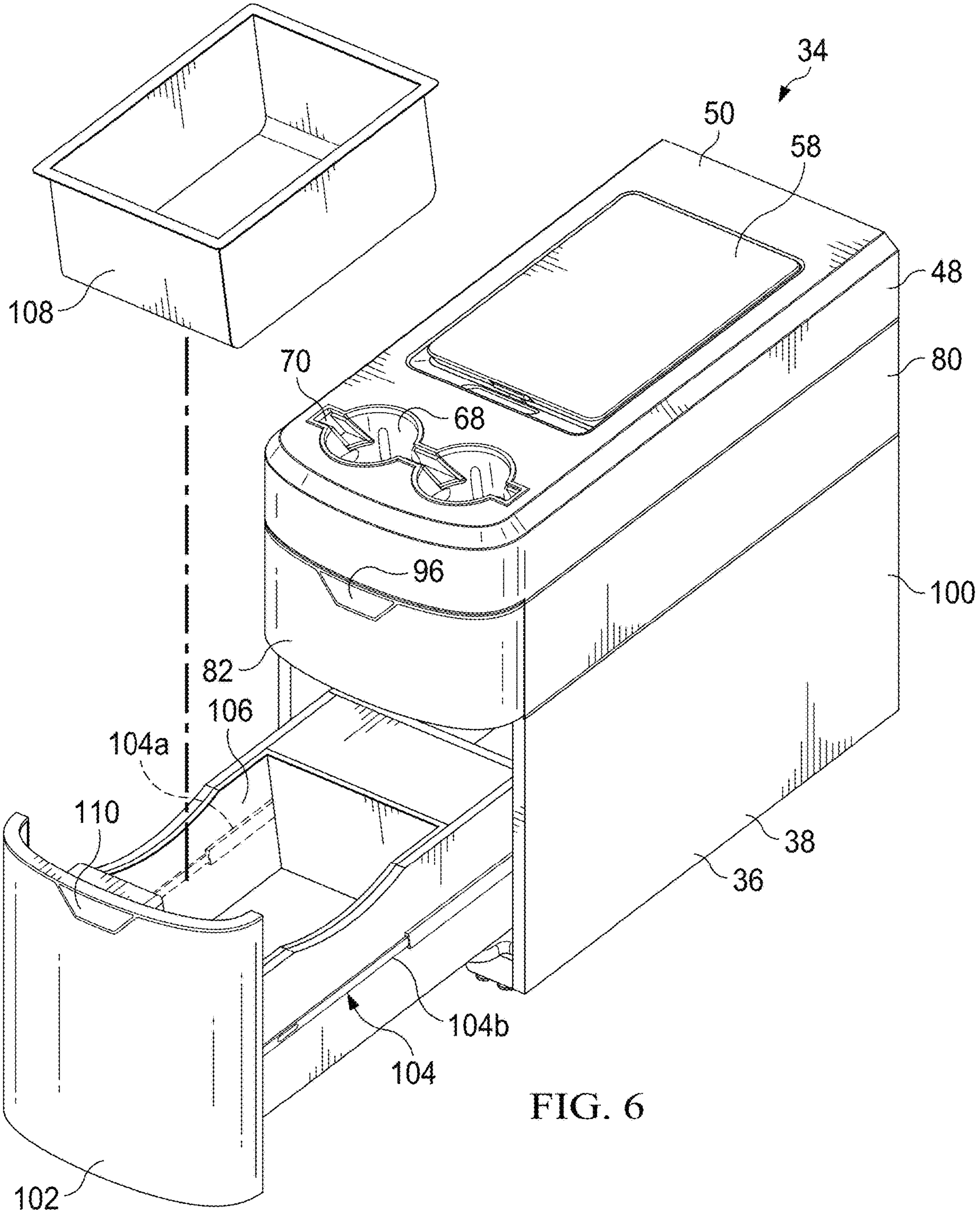
FIG. 6 is an exploded view of an aircraft cabin storage console depicting features of a lower drawer in accordance with embodiments of the present disclosure.

Intermediate drawer 82 has a closed position (see FIG. 5C), a partially open position (see FIGS. 5A and 5D) and a fully open position (see FIGS. 5B and 5E) relative to frame 36. Intermediate drawer 82 has a unique two-stage opening mechanism 90 that enables intermediate drawer 82 to be selectively secured in the partially open position to provide access to right and left concealable cup holders 88*a*, 88*b* while substantially maintaining intermediate concealable storage compartment 86 in a concealed orientation. In the illustrated embodiment, two-stage opening mechanism 90 includes a right detent receiver 92*a* and a left detent receiver 92*b*. Right detent receiver 92*a* is coupled to an outer surface of intermediate drawer 82 proximate the aft end thereof and above right telescoping slide 84*a*. Likewise, left detent receiver 92*b* is coupled to an outer surface of intermediate drawer 82 proximate the aft end thereof and above left telescoping slide 84*b*. Two-stage opening mechanism 90 also includes a right detent mechanism 94*a* and a left detent mechanism 94*b*. Right detent mechanism 94*a* is coupled to an inner surface of right sidewall 40 proximate a center portion thereof and above right telescoping slide 84*a*. Likewise, left detent mechanism 94*b* is coupled to an inner surface of left sidewall 38 proximate a center portion thereof and above left telescoping slide 84*b*. In the illustrated embodiment, right detent receiver 92*a* has a detent plate with leading and trailing wedges having upper and lower notches therebetween. Right detent mechanism 94*a* has upper and lower spring-biased elements such as spring-biased rollers, spring-biased balls or spring-biased pins, which may be selectively seated in the upper and lower notches of right detent receiver 92*a*, as best seen in FIG. 5D. Likewise, left detent receiver 92*b* has a detent plate with leading and trailing wedges having upper and lower notches therebetween (see FIG. 5G). Left detent mechanism 94*b* has upper and lower spring-biased elements such as spring-biased rollers, spring-biased balls or spring-biased pins, which may be selectively seated in the upper and lower notches of left detent receiver 92*b*, as best seen in FIG. 5D. In this partially open position of intermediate drawer 82, the cooperation of detent receivers 92*a*, 92*b* with detent mechanisms 94*a*, 94*b* secures intermediate drawer 82 against unwanted translation toward either the closed position or the fully open position while providing access to right and left concealable cup holders 88*a*, 88*b*, as best seen in FIG. 5A.

When it is desired to translate intermediate drawer 82 from the partially open position to the fully open position, the bias force of detent mechanisms 94*a*, 94*b* may be overcome by applying a suitable pulling force on intermediate drawer 82 using, for example, a handle 96 on the forward face of intermediate drawer 82. Intermediate drawer 82 may be returned to the partially open position from the fully open position by pushing intermediate drawer 82 toward the close position until detent mechanisms 94*a*, 94*b* reseat in detent receivers 92*a*, 92*b*, thereby securing intermediate drawer 82 in the partially open position. Similarly, when it is desired to translate intermediate drawer 82 from the partially open position to the closed position, the bias force of detent mechanisms 94*a*, 94*b* may be overcome by applying a suitable pushing force on intermediate drawer 82. Intermediate drawer 82 may be returned to the partially open position from the closed position by pulling intermediate drawer 82 toward the fully open position using, for example, handle 96 until detent mechanisms 94*a*, 94*b* reseat in detent receivers 92*a*, 92*b*, thereby securing intermediate drawer 82 in the partially open position.

Even though two-stage opening mechanism 90 has been depicted and described as having detent receivers that are coupled to the intermediate drawer and detent mechanisms that are coupled to the frame of the aircraft cabin storage console, it should be understood by those having ordinary skill in the art that a two-stage opening mechanism of the present disclosure could alternatively have detent mechanisms that are coupled to the intermediate drawer and detent receivers that are coupled to the frame of the aircraft cabin storage console without departing from the principles of the present disclosure. Also, even though two-stage opening mechanism 90 has been depicted and described as having detent mechanisms with upper and lower spring-biased elements that seat within upper and lower notches of the detent receivers, it should be understood by those having ordinary skill in the art that a two-stage opening mechanism of the present disclosure could alternatively have detent mechanisms each including a single spring-biased element that seats within a single notch of the respective detent receiver without departing from the principles of the present disclosure. In addition, even though two-stage opening mechanism 90 has been depicted and described as having mechanical detent mechanisms, it should be understood by those having ordinary skill in the art that a two-stage opening mechanism of the present disclosure could alternatively have magnetic detent mechanisms without departing from the principles of the present disclosure.

Aircraft cabin storage console 34 has a lower storage section 100 that is positioned below intermediate storage section 80. Lower storage section 100 includes a lower drawer 102 that is slidably coupled to frame 36 with a lower telescoping slide mechanism 104 including a right telescoping slide 104*a* and a left telescoping slide 104*b*. An outer portion of right telescoping slide 104*a* is coupled to frame 36 and an inner portion of right telescoping slide 104*a* is coupled to lower drawer 102. Likewise, an outer portion of left telescoping slide 104*b* is coupled to frame 36 and an inner portion of left telescoping slide 104*b* is coupled to lower drawer 102. Lower telescoping slide mechanism 104 supports lower drawer 102 within frame 36 and provides lower drawer 102 with a translation degree of freedom relative to frame 36. Lower drawer 102 includes a lower concealable storage compartment 106 that is sized to receive purses, briefcases, backpacks, bag of food and the like. Alternatively, lower concealable storage compartment 106 may receive a removeable ice bin 108 therein such that food and/or drinks may be stored on ice to maintain such items at a desired temperature. Lower drawer 102 may be open and closed using a handle 110 positioned on the forward face of lower drawer 102.

Figure 7:
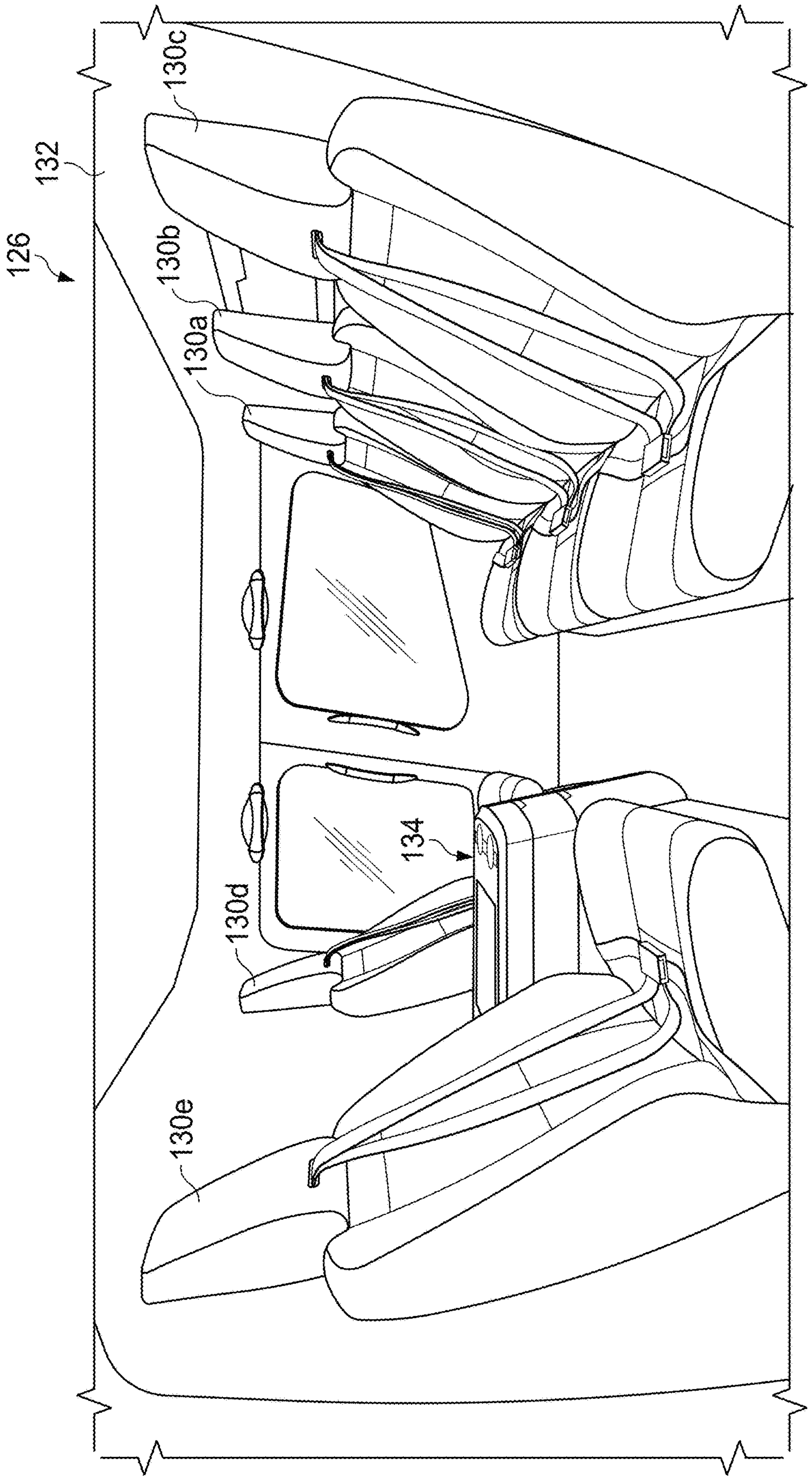
FIG. 7 is a side view of an aircraft cabin including an aircraft cabin storage console positioned between two aft-facing passenger seats in accordance with embodiments of the present disclosure.

Even though aircraft cabin storage console 34 has been depicted and described as be positioned between two forward-facing passenger seats, it should be understood by those having ordinary skill in the art that a storage console of the present disclosure could be positioned in other locations within an aircraft cabin without departing from the principle of the present disclosure. For example, as best seen in FIG. 7 of the drawings, an aircraft cabin 126 includes a row of forward-facing passenger seats 130*a*, 130*b*, 130*c* that are positioned in front of a bulkhead 132 with a row of aft-facing passenger seats 130*d*, 130*e* positioned forward thereof and behind the cockpit seats. In the illustrated embodiment, an aircraft cabin storage console 134 is positioned between passenger seats 130*d*, 130*e*. Similar to aircraft cabin storage console 34, aircraft cabin storage console 134 has a plurality of purposefully-sized storage areas for the most common types of items transported by passengers such as mobile phones, tablets, laptop computers, purses, briefcases, food and beverages and includes an upper storage section with an upper concealable storage compartment and a cupholder assembly, an intermediate storage section with an intermediate drawer having a two-stage opening mechanism that selectively provides secure access to a concealable cupholder assembly and lower storage section with a lower drawer having a lower concealable storage compartment.

Figure 8:
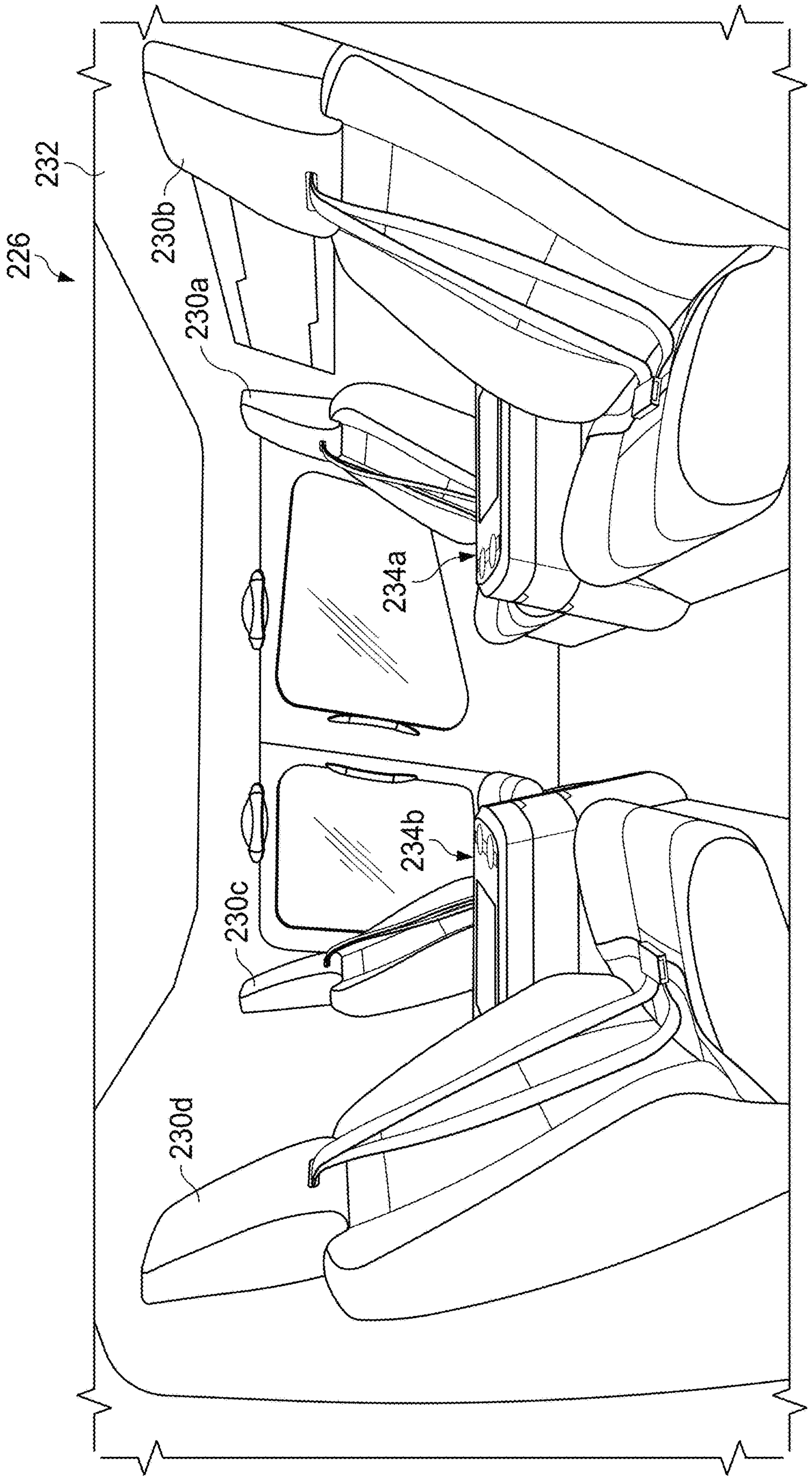
FIG. 8 is a side view of an aircraft cabin including a first aircraft cabin storage console positioned between two forward-facing passenger seats and a second aircraft cabin storage console positioned between two aft-facing passenger seats in accordance with embodiments of the present disclosure.

Even though aircraft cabins 26, 126 have been depicted and described having one aircraft cabin storage console 34, 134 positioned therein, it should be understood by those having ordinary skill in the art that more than one aircraft cabin storage console may be positioned within an aircraft cabin without departing from the principle of the present disclosure. For example, as best seen in FIG. 8 of the drawings, an aircraft cabin 226 includes a row of forward-facing passenger seats 230*a*, 230*b* that are positioned in front of a bulkhead 232 with a row of aft-facing passenger seats 230*c*, 230*d* positioned forward thereof and behind the cockpit seats. In the illustrated embodiment, a first aircraft cabin storage console 234*a* is positioned between passenger seats 230*a*, 230*b* and a second aircraft cabin storage console 234*b* is positioned between passenger seats 230*c*, 230*d*. Similar to aircraft cabin storage consoles 34, 134, aircraft cabin storage consoles 234*a*, 234*b* each has a plurality of purposefully-sized storage areas for the most common types of items transported by passengers such as mobile phones, tablets, laptop computers, purses, briefcases, food and beverages and includes an upper storage section with an upper concealable storage compartment and a cupholder assembly, an intermediate storage section with an intermediate drawer having a two-stage opening mechanism that selectively provides secure access to a concealable cupholder assembly and lower storage section with a lower drawer having a lower concealable storage compartment.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft cabin storage console positionable between passenger seats of an aircraft, the aircraft cabin storage console comprising:

a frame having first and second sidewalls and an aft wall;

an upper storage section forming an upper surface, the upper storage section fixably coupled to the frame, the upper storage section including first and second cup holders;

an intermediate drawer slidably coupled to the frame, the intermediate drawer forming an intermediate concealable storage compartment and including third and fourth concealable cup holders, the intermediate drawer having a closed position, a partially open position and a fully open position relative to the frame;

a lower drawer slidably coupled to the frame, the lower drawer forming a lower concealable storage compartment; and a two-stage opening mechanism configured to selectively secure the intermediate drawer in the partially open position to provide access to the third and fourth concealable cup holders and configured to selectively allow the intermediate drawer to be shifted between the partially open position and the fully open position to provide access to the intermediate concealable storage compartment.

2. The aircraft cabin storage console as recited in claim 1 wherein, the upper storage section forms an upper concealable storage compartment and has a hingable lid having open and closed positions to selectively provide access to the upper concealable storage compartment.

3. The aircraft cabin storage console as recited in claim 2 wherein, the upper concealable storage compartment includes one or more charging ports.

4. The aircraft cabin storage console as recited in claim 2 wherein, in the closed position, the hingable lid forms a gap with the upper surface configured to pass one or more charging cords therethrough.

5. The aircraft cabin storage console as recited in claim 1 wherein, the first and second cup holders include angled slots configured to hold one or more electronic devices at a viewing angle.

6. The aircraft cabin storage console as recited in claim 1 wherein, the third and fourth concealable cup holders are forward of the intermediate concealable storage compartment of the intermediate drawer.

7. The aircraft cabin storage console as recited in claim 1 further comprising an intermediate telescoping slide mechanism that slidably couples the intermediate drawer to the frame.

8. The aircraft cabin storage console as recited in claim 7 wherein, the two-stage opening mechanism further comprises a detent mechanism and a detent receiver positioned between the intermediate drawer and the frame.

9. The aircraft cabin storage console as recited in claim 8 wherein, the detent mechanism is coupled to the frame and the detent receiver is coupled to the intermediate drawer.

10. The aircraft cabin storage console as recited in claim 9 wherein, the detent receiver is coupled to the intermediate drawer aft of the third and fourth concealable cup holders.

11. The aircraft cabin storage console as recited in claim 9 wherein, the detent receiver is coupled to the intermediate drawer above the intermediate telescoping slide mechanism.

12. The aircraft cabin storage console as recited in claim 7 wherein, the two-stage opening mechanism further comprises first and second oppositely disposed detent mechanisms and first and second oppositely disposed detent receivers positioned between the intermediate drawer and the frame.

13. The aircraft cabin storage console as recited in claim 12 wherein, the detent mechanisms are coupled to the frame and the detent receivers are coupled to the intermediate drawer.

14. The aircraft cabin storage console as recited in claim 13 wherein, the detent receivers are coupled to the intermediate drawer aft of the third and fourth concealable cup holders.

15. The aircraft cabin storage console as recited in claim 13 wherein, the detent receivers are coupled to the intermediate drawer above the intermediate telescoping slide mechanism.

16. The aircraft cabin storage console as recited in claim 1 further comprising a lower telescoping slide mechanism that slidably couples the lower drawer to the frame.

17. The aircraft cabin storage console as recited in claim 1 further comprising a removeable ice bin positionable in the lower concealable storage compartment.

18. An aircraft cabin comprising:

first and second passenger seats;

an aircraft cabin storage console positioned between the first and second passenger seats, the aircraft cabin storage console comprising:

a frame having first and second sidewalls and an aft wall;

an upper storage section forming an upper surface, the upper storage section fixably coupled to the frame, the upper storage section including first and second cup holders;

an intermediate drawer slidably coupled to the frame, the intermediate drawer forming an intermediate concealable storage compartment and including third and fourth concealable cup holders, the intermediate drawer having a closed position, a partially open position and a fully open position relative to the frame;

a lower drawer slidably coupled to the frame, the lower drawer forming a lower concealable storage compartment; and a two-stage opening mechanism configured to selectively secure the intermediate drawer in the partially open position to provide access to the third and fourth concealable cup holders and configured to selectively allow the intermediate drawer to be shifted between the partially open position and the fully open position to provide access to the intermediate concealable storage compartment.

19. An aircraft comprising:

a fuselage;

an aircraft cabin positioned within the fuselage;

first and second passenger seats positioned within the aircraft cabin;

an aircraft cabin storage console positioned between the first and second passenger seats, the aircraft cabin storage console comprising:

a frame having first and second sidewalls and an aft wall;

an upper storage section forming an upper surface, the upper storage section fixably coupled to the frame, the upper storage section including first and second cup holders;

an intermediate drawer slidably coupled to the frame, the intermediate drawer forming an intermediate concealable storage compartment and including third and fourth concealable cup holders, the intermediate drawer having a closed position, a partially open position and a fully open position relative to the frame;

a lower drawer slidably coupled to the frame, the lower drawer forming a lower concealable storage compartment; and a two-stage opening mechanism configured to selectively secure the intermediate drawer in the partially open position to provide access to the third and fourth concealable cup holders and configured to selectively allow the intermediate drawer to be shifted between the partially open position and the fully open position to provide access to the intermediate concealable storage compartment.

20. The aircraft as recited in claim 19 wherein, the aircraft is a rotorcraft.

* * * * *